April 5, 1966 A. B. WALLACE 3,244,951
LAMINATED ROTOR STRUCTURE FOR VARIABLE CAPACITORS
Filed June 3, 1964
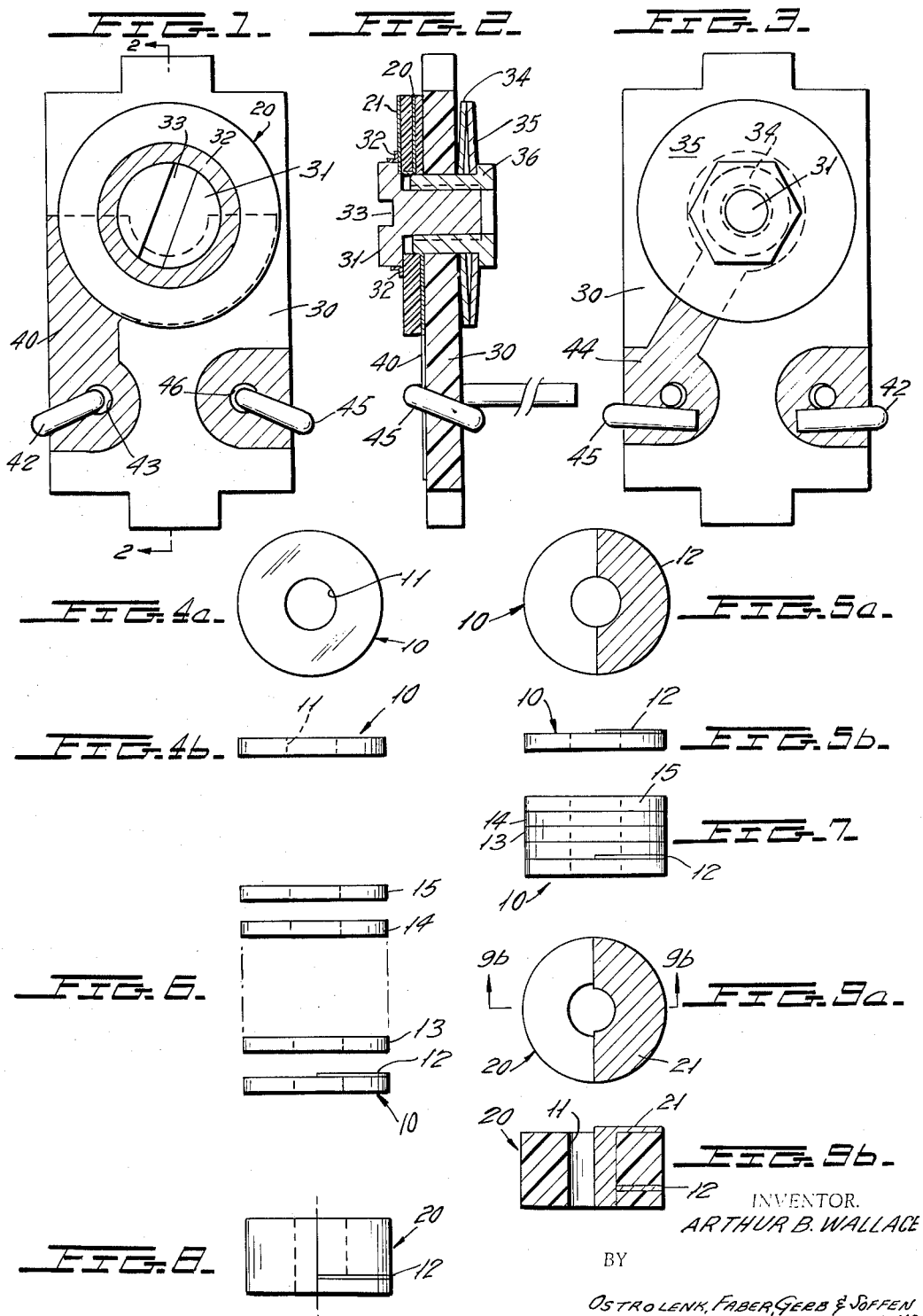
INVENTOR.
ARTHUR B. WALLACE
BY
OSTROLENK, FABER, GERB & SOFFEN
ATTORNEYS

United States Patent Office 3,244,951
Patented Apr. 5, 1966

3,244,951
LAMINATED ROTOR STRUCTURE FOR
VARIABLE CAPACITORS
Arthur B. Wallace, Baldwin, N.Y., assignor to JFD
Electronics Corporation, Brooklyn, N.Y., a corporation
of New York
Filed June 3, 1964, Ser. No. 372,339
4 Claims. (Cl. 317—249)

This invention relates to a novel rotor for reactors, and more specifically relates to a novel rotor construction for trimmer capacitors.

Trimmer capacitors are well known to the art wherein a ceramic rotor having a portion of the top surface thereof metallized serves as the variable plate of the capacitor. The stationary electrode is formed on the rotor mounting structure whereby rotation of the rotor adjusts the capacitance between the rotor electrode and stator electrode.

The present invention permits the construction of a high capacitance ceramic rotor from low dielectric constant material. More specifically, the capacitance of the trimmer capacitor having a ceramic rotor is usually quite low since most of the stable titanate ceramic materials have low dielectric constants. Moreover, it is extremely difficult to form ceramic rotors less than 0.020 inch thick since the torque required to rotate the rotor will generally fracture a thinner rotor structure.

The principle of the present invention is to utilize a plurality of extremely thin unfired, and thus flexible ceramic discs which could have a thickness of the order of 0.002 inch wherein one of these wafers is metallized, prior to firing, to form the rotor electrode while this metallized plate is then being reinforced by a plurality of similar unfired discs or a single thick unfired disc. The complete assembly is then fired and has a sufficient overall thickness to make the rotor strong enough for the mechanical rotation thereof. The resulting rotor will have a relatively small spacing from the embedded rotor electrode and the stator electrode (of the order of 0.002 inch as contrasted to 0.010–0.020 inch in the prior art) whereby the capacitance of the device is substantially increased over the prior art devices wherein the rotor is in the uppermost surface of the relatively thick rotor.

This unfired stack is then pressed and fired in the usual manner whereby the rotor electrode is embedded in a dense monolithic unit.

Accordingly, a primary object of this invention is to provide a novel rotor structure for reactors.

A further object of this invention is to provide a novel method of manufacture of a ceramic rotor for trimmer capacitor application.

Yet another object of this invention is to provide a relatively high capacitance ceramic rotor using a low dielectric constant material.

A still further object of this invention is to provide a mechanically rugged rotor for trimmer capacitors where the rotor electrode is embedded in the rotor and is spaced from a stator electrode by the distance of the order of 0.002 inch.

These and other objects of this invention will become apparent from the following description when taken in connection with the drawings in which:

FIGURE 1 is a front view of the assembled trimmer capacitor.

FIGURE 2 is a side cross-sectional view of FIGURE 1 taken across the lines 2—2 in FIGURE 1.

FIGURE 3 is a rear view of the assembly of FIGURES 1 and 2.

FIGURES 4a and 4b are front and side views respectively of one of the unfired ceramic discs used for forming the rotor of FIGURES 1 and 2.

FIGURES 5a and 5b are front and side views respectively of a disc of the type shown in FIGURES 4a and 4b after a metallized electrode is placed thereon.

FIGURE 6 is an exploded side view illustrating the manner in which a plurality of wafers are assembled with respect to one another to form the full rotor.

FIGURE 7 illustrates the stack of FIGURE 6 in side view after a pressing operation.

FIGURE 8 illustrates the stack of FIGURE 7 after firing and illustrates the monolithic structure for the rotor.

FIGURES 9a and 9b are a top and a side cross-sectional view respectively of the rotor assembly of FIGURE 8 after a silver paste is applied and baked on to the rotor to serve as an electrical connection means.

Referring first to FIGURES 4a and 4b, I have illustrated therein a ceramic disc of a titanate ceramic material 10 which has an opening 11 therein and may have a thickness of the order of 0.002 inch and a diameter of .200 inch. The disc 10 is a flexible and unfired thin sheet of material which is easily fabricated and will not break during handling. This extremely thin disc then has half of its top surface metallized, as best shown in FIGURES 5a and 5b, with some suitable noble metal paste such as palladium, shown as electrode 12 in FIGURES 5a and 5b.

In order to form the rotor, the wafer 10 of FIGURES 5a and 5b, having its electrode 12 thereon, is placed beneath a plurality of substantially identical unfired discs, such as discs 13, 14 and 15 of FIGURE 6. In a typical embodiment, a stack of the order of fifteen discs can be provided. Alternatively, a single thick unfired disc could replace the stack of discs 13 to 15.

Thereafter, and as shown in FIGURE 7, the stack is placed in a suitable die and pressed at a pressure of the order of fifteen tons per square inch. This pressed stack of FIGURE 7 is then fired at some suitable temperature which fuses the noble metal paste electrode 12 to the ceramic and also fuses the various ceramic discs to one another to form the dense monolithic unit 20 of FIGURE 8.

Thereafter, and as best shown in FIGURES 9a and 9b, a silver paste 21 is applied to one half of the interior of the aligned openings 11 and over the top surface of rotor 20 in registry with electrode 12. The silvered area in the opening 11 makes electrical contact to the electrode 12 and connects electrode 12 to the metallized area on the top of the assembled rotor 20 which serves as an area to which suitable hardware of the assembly of the trimmer capacitor may be connected.

It is to be particularly noted that the electrode 12 is now extremely close to the bottom of rotor 20 (of the order of 0.002 inch) whereby a stator electrode in this region will be very close to electrode 12 so that the capacitance between the rotor electrode and the stator electrode will be high. It should be further noted that any attempt to manufacture any single thin wafer, having a thickness of the region below in FIGURE 9b, would fail since a fired wafer of this thinness would be virtually impossible to handle.

A completely assembled unit using the rotor of FIGURES 9a and 9b is illustrated in FIGURES 1, 2 and 3 and includes an insulation support plate 30 which receives a screw 31 which is soldered by any suitable technique to the upper surface of rotor 20 of FIGURE 9b by the solder region 32. The screw 31 has a screw driver slot 33 therein to permit rotation of rotor 20. The screw 31 passes through insulation plate 30 and is received by a U-shaped cross-section nut 36, as best shown in FIGURE 2. The screw 31 and rotor 20 are biased toward engagement with board 30 by means of suitable spring washers 34 and 35 which abut an extending head on nut 36. The spring washer pressure, however, is not so high that it would cause binding of rotor 20, but is low enough to permit rotation of rotor 20 by rotation of screw 31.

The stator electrode is then formed by a conductive surface 40 (FIGURE 1) which extends beneath rotor 20, as shown in dotted lines, and is electrically insulated from electrode 12. An electrical lead 42 is then receivable through an opening 43 in board 30 and can be soldered thereto in the usual manner.

A rotor electrical connection is then formed by conductive surface section 44 (FIGURE 3) engaged by conductive spring washers 34 and 35 whereby conductive section 44 is electrically connected to spring washers 34 and 35 through nut 36, screw 31, silver electrode 21 to the electrode 12. The conductive area 44 may then receive an electrical lead 45 through opening 46 in the usual manner.

In the foregoing, the novel rotor structure has been described as a rotor having an opening therethrough. Clearly, however, the rotor may be formed of discs without a center hole, all operations being similar to those described above with a hole being sandblasted therein after forming the monolithic disc.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A trimmer capacitor comprising in combination, a rotor structure, a stator electrode and support means for supporting said rotor structure and said stator electrode; said stator electrode comprising a flat conductive member secured to one surface of said support means; a rotor structure comprising a substantially homogeneous mass of ceramic material having a disc-shape; said disc-shaped material having a central opening therein; and a single layer of conductive material embedded in said ceramic disc; said conductive layer being in a plane parallel to the top and bottom surfaces of said ceramic disc; said conductive layer having a semicircular surface shape; said conductive layer being at an axial position in said disc corresponding to the order of one-tenth the thickness of said disc; rotational support means rotatably connecting said rotor structure to said support means; the bottom of said disc closest to said conductive layer in said disc disposed adjacent said flat conductive member and spaced therefrom by said order to one-tenth the thickness of said disc; and first and second terminal means insulated from one another and electrically connected to said stator electrode and to said conductive layer in said disc, respectively.

2. A trimmer capacitor comprising in combination, a rotor structure, a stator electrode and support means for supporting said rotor structure and said stator electrode; said stator electrode comprising a flat conductive member secured to one surface of said support means; a rotor structure comprising a substantially homogeneous mass of ceramic material having a disc shape; said disc-shaped material having a central opening therein; and a single layer of conductive material embedded in said ceramic disc; said conductive layer being in a plane parallel to the top and bottom surfaces of said ceramic disc; said conductive layer having a semicircular surface shape; said conductive layer being axially located in said disc to be closer to the bottom surface than to the top surface of said disc; the distance from the bottom of said conductive layer to said bottom surface being approximately 0.002 inch; the distance from the top of said conductive layer to the top surface of said conductive layer being greater than 0.018 inch; rotational support means rotatably connecting said rotor structure to said support means; said bottom surface of said disc disposed adjacent said flat conductive member; and first and second terminal means insulated from one another and electrically connected to said stator electrode and to said conductive layer in said disc, respectively.

3. The device substantially as set forth in claim 1 which further includes a second conductive layer extending across the top surface of said disc, and into said opening and into contact with said conductive layer; said second conductive layer at said top surface having a semicircular surface shape in registry along the axis of said disc with the semicircular shape of said conductive layer.

4. The device substantially as set forth in claim 2 which further includes a second conductive layer extending across the top surface of said disc, and into said opening and into contact with said conductive layer; said second conductive layer at said top surface having semicircular surface shape in registry along the axis of said disc with the semicircular shape of said conductive layer.

References Cited by the Examiner

UNITED STATES PATENTS

| 2,808,546 | 10/1957 | Connor | 317—253 |
| 2,975,500 | 3/1961 | Hosbein | 29—527 |
| 3,015,765 | 1/1962 | Repko et al. | 317—253 |
| 3,017,696 | 1/1962 | Vaaler | 29—527 |

FOREIGN PATENTS 764,965   6/1954   Germany.

ROBERT K. SCHAEFER, *Primary Examiner.*

JOHN F. BURNS, *Examiner.*

D. J. BADER, *Assistant Examiner.*